July 2, 1963  I. C. CHEESEMAN ETAL  3,096,041
AIRCRAFT

Filed Dec. 20, 1960  10 Sheets-Sheet 1

Ian Clifford Cheeseman
Charles Ernest Moss
Inventors

By
Stevens Davis Miller & Mosher
Attorneys

July 2, 1963 I. C. CHEESEMAN ET AL 3,096,041
AIRCRAFT
Filed Dec. 20, 1960 10 Sheets-Sheet 3
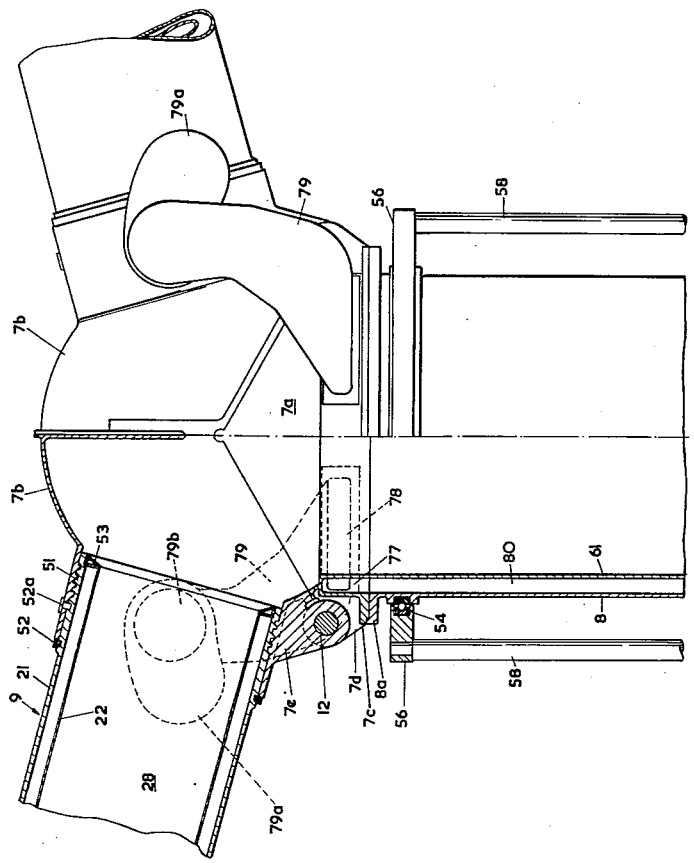
Ian Clifford Cheeseman
Charles Ernest Moss
Inventors
By
Attorneys Ian Clifford Cheeseman
Charles Ernest Moss
Inventors
By
Stevens Davis Miller & Mosher
Attorneys

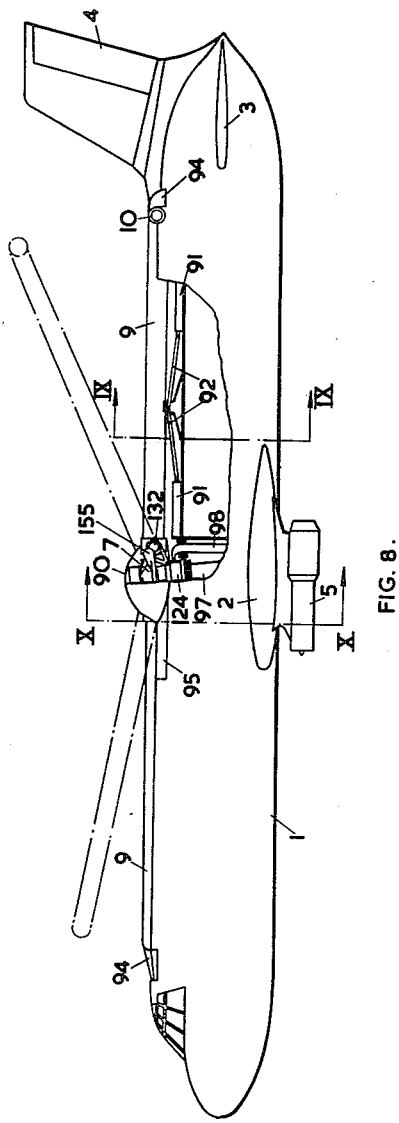

July 2, 1963     I. C. CHEESEMAN ET AL     3,096,041
AIRCRAFT

Filed Dec. 20, 1960     10 Sheets-Sheet 6

Ian Clifford Cheeseman
Charles Ernest Moss
*Inventors*
By
Stevens Davis Miller + Mosher
*Attorneys*

July 2, 1963     I. C. CHEESEMAN ETAL     3,096,041
AIRCRAFT

Filed Dec. 20, 1960

Ian Clifford Cheeseman
Charles Ernest Moss
*Inventors*
By
Stevens Davis Miller & Mosher
*Attorneys*

Ian Clifford Cheeseman
Charles Ernest Moss
Inventors
By
Stevens Davis Miller & Mosher
Attorneys

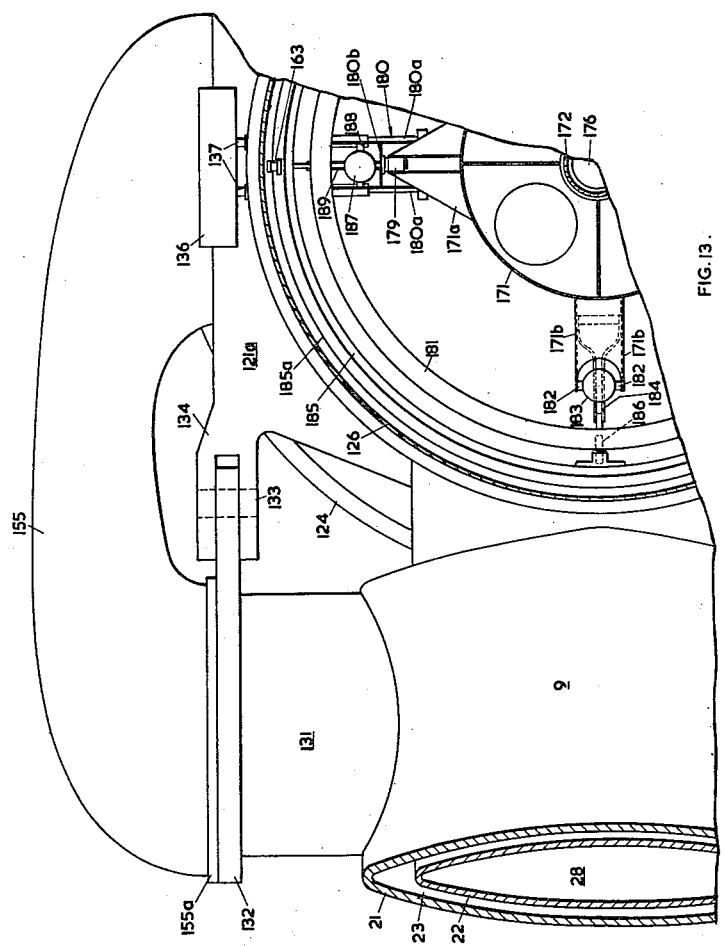

United States Patent Office 3,096,041
Patented July 2, 1963

3,096,041
AIRCRAFT
Ian Clifford Cheeseman, Hawley, and Charles Ernest Moss, Farnborough, England, assignors to Power Jets (Research and Development) Limited, London, England, a British company
Filed Dec. 20, 1960, Ser. No. 77,091
Claims priority, application Great Britain Jan. 7, 1960
9 Claims. (Cl. 244—7)

The present invention relates to aircraft and is primarily concerned with an aircraft which in one flight phase, e.g., in cruise, is capable of forward flight in conventional manner supported by aerodynamic lift on the wings, and in another flight phase, e.g., on take-off and landing, is capable of operation as a helicopter. Such an aircraft is sometimes referred to as a "convertiplane."

Various forms of convertiplane are already known or have been proposed, but none of these has proved to be altogether satisfactory. Thus in one known arrangement the helicopter rotor is partly relieved of the aircraft weight and allowed to autorotate in forward flight, but it still imposes a severe limitation on the maximum forward flight speed. In one prior proposal, the helicopter rotor is capable of being turned to a position at which it rotates about a horizontal axis so that it acts as a propeller to produce thrust in forward flight, while in another prior proposal the aircraft wing can be tilted so that the propellers mounted thereon can act as helicopter rotors on take-off and landing. However in these arrangements the design of the rotors or propellers must necessarily be a compromise to enable them to operate in both the propeller and lifting rotor roles, and the performance will suffer.

The present invention is therefore concerned with a convertiplane wherein the drive to the rotor is discontinued in cruising flight, the rotor being allowed to slow down and finally stop. However if such an aircraft has helicopter rotor blades of conventional aerofoil shape, a danger arises from the possible occurrence of gusts in the transition phase. It will be understood that due to the forward movement of the aircraft the absolute speed of the retreating blade may be zero or negative. Under these conditions the rotor blades would of course be feathered so that the lift thereon is nil. However should an up-gust then occur, the blades will be at incidence to the resultant airflow. Lift will then be generated on the advancing blade while there is no lift on the retreating blade, and the asymmetric lifting force can give rise to an overturning moment which is great enough to upset the aircraft.

Accordingly the invention consists in a convertiplane having a helicopter rotor with blades of substantially circular cross-section. Lift may be induced on the blades by boundary layer control, and in particular the blades may be formed with long shallow apertures extending along the blade span and arranged to discharge fluid streams as thin layers over the blade surfaces. When boundary layer control is not in use, the lift on such substantially circular section blades will be only slightly affected by gusts and so the danger of overturning referred to above is minimised.

A circular or near-circular section rotor blade has the additional advantage of high strength in bending compared with blades of conventional aerofoil form. Further the circular shape has the optimum ratio of cross-sectional area to periphery for leading a propulsive gas stream therethrough to tip jet units.

According to a further feature of the invention there are provided ducts for leading fluid to the boundary layer control apertures in the blades and valves for controlling the fluid supply to each blade. A control mechanism is connected to the valves and is operable to vary the opening thereof so that the fluid supply to the blades is varied cyclically in accordance with the rotation of the rotor, this control being equivalent to the conventional cyclic pitch control of a helicopter. In addition a further control, equivalent to the conventional collective pitch control of a helicopter, is provided to vary the opening of the valves and hence the fluid supply to the blades in unison.

The invention further provides a convertiplane with substantially circular section helicopter rotor blades as aforesaid, a fuselage upon which the rotor is mounted, and wings capable of supporting the aircraft by aerodynamic lift thereon in forward flight, the rotor blades being capable of being at least partly retracted into the fuselage.

Preferably the rotor is two-bladed. No flapping hinges are provided but the blades are pivotally attached to the rotor head and are movable about their pivots between an operative position in which they are locked at a predetermined cone angle and an inoperative position in which they lie in a plane generally parallel to the longitudinal axis of the aircraft.

The blades in their inoperative position may lie in longitudinally extending recesses in the fuselage upper surface, or the rotor head may be bodily movable so that the rotor head and blades can be completely retracted into the fuselage.

The invention will now be more fully described by way of example with reference to the accompanying diagrammatic drawings, of which:

Figure 7B:
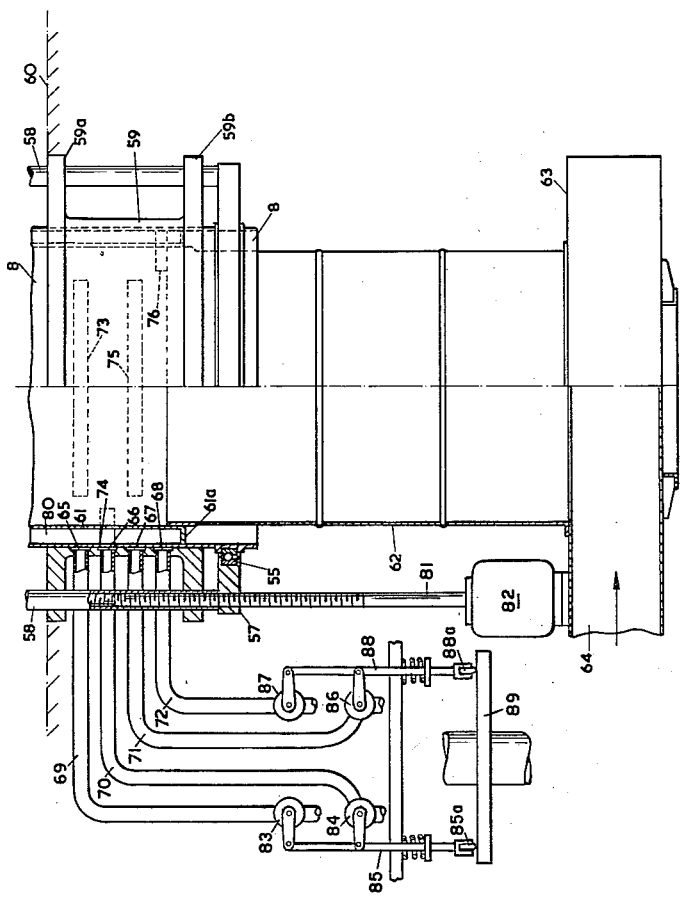

FIGURES 7a and 7b together form a part sectional view of the rotor head and pillar.

FIGURE 8 is a side view of an alternative form of an aircraft according to the present invention, part of the side of the aircraft being shown as broken away to reveal the interior construction.

Figure 9:
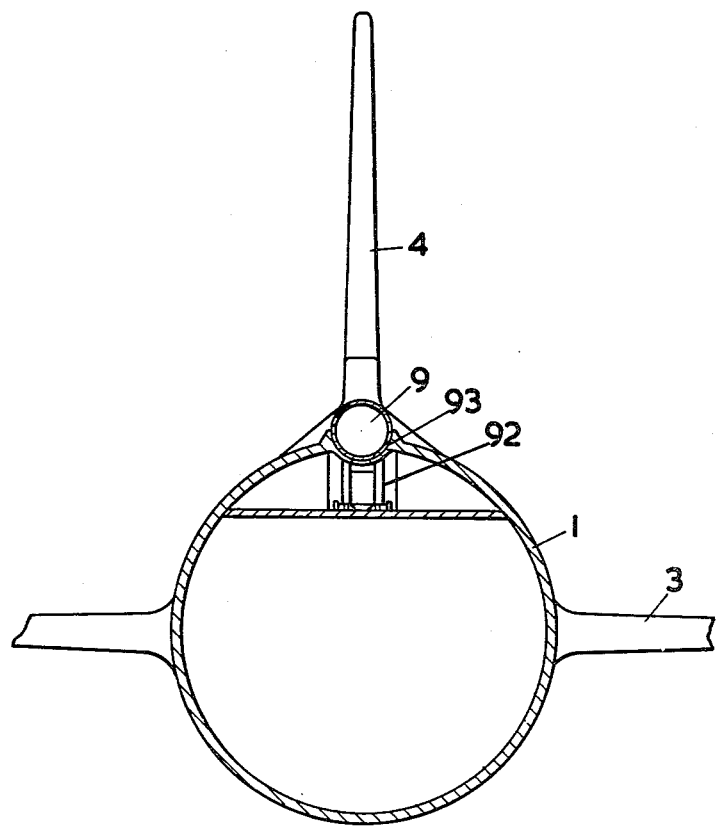
Figure 10:
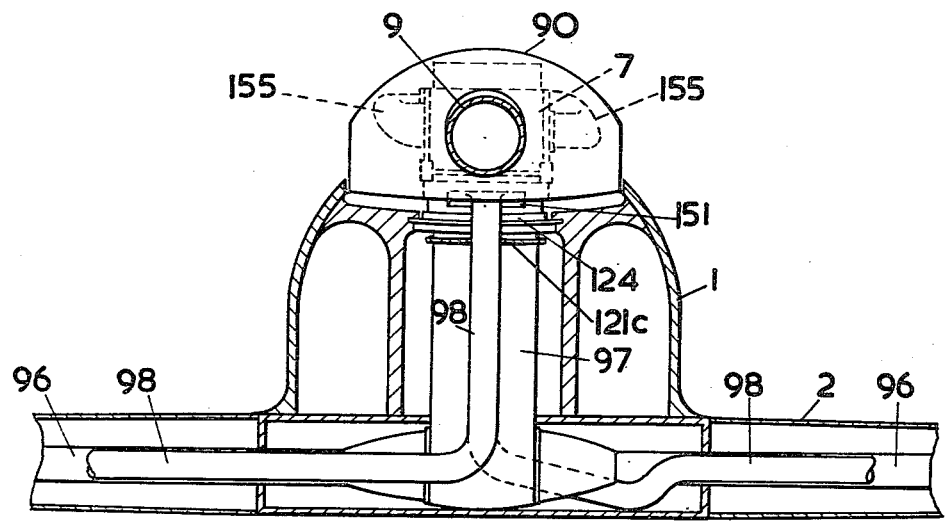

FIGURES 9 and 10 are transverse sections through the fuselage of the aircraft taken on the lines IX—IX and X—X in FIGURE 8.

Figure 11:
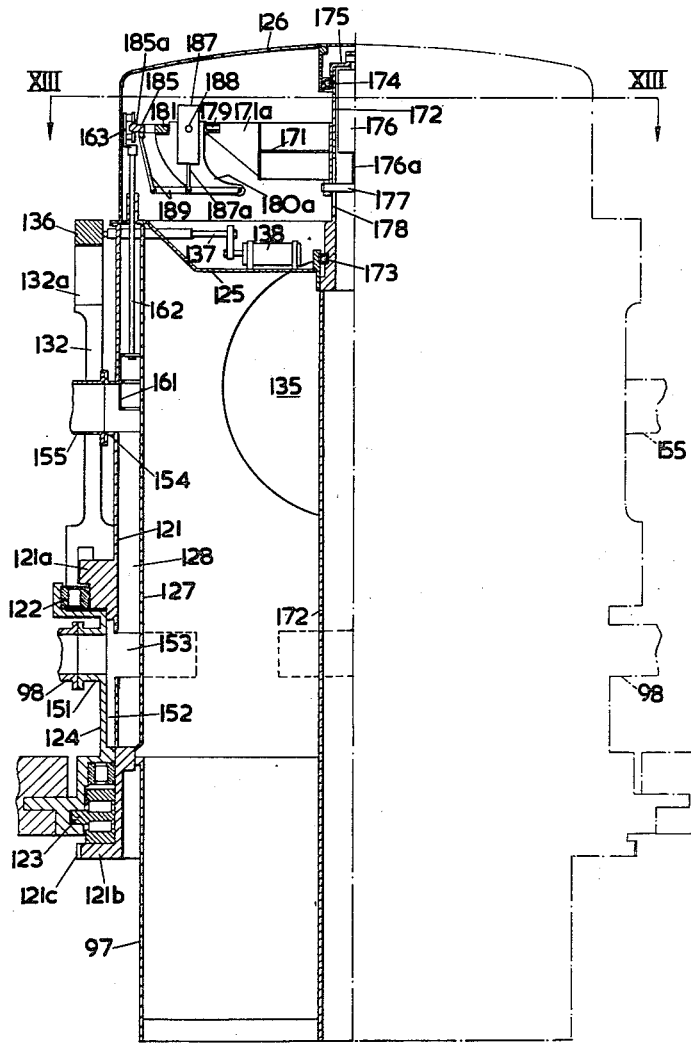

FIGURE 11 is a half-sectional view of the rotor head of the aircraft of FIGURE 8.

Figure 12:
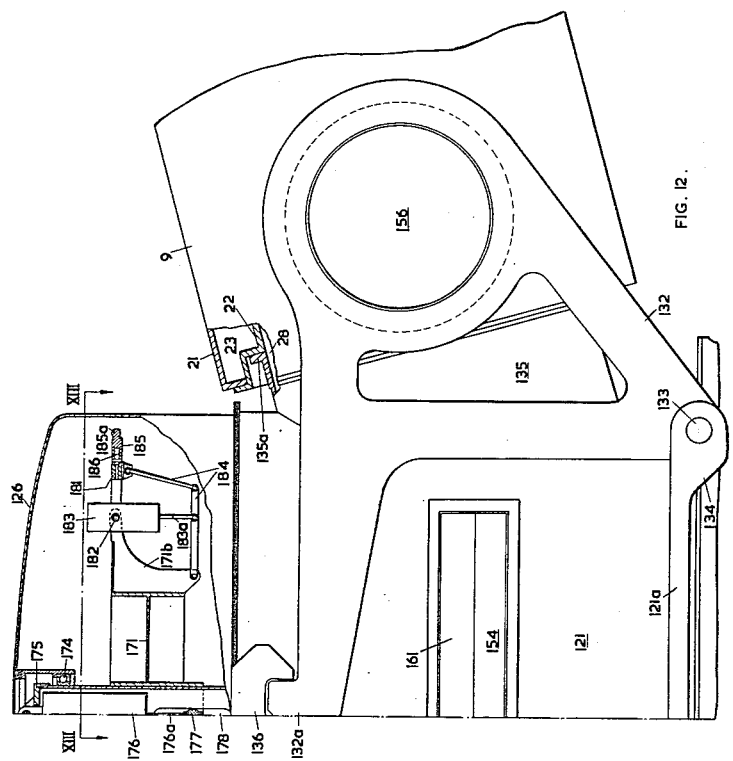

FIGURE 12 is part sectional view of the upper part of the rotor head at right angles to the section plane of FIGURE 11.

FIGURE 13 is a fragmentary horizontal section through the aircraft rotor head taken on the plane indicated at XIII—XIII in FIGURES 11 and 12.

Figure 14:
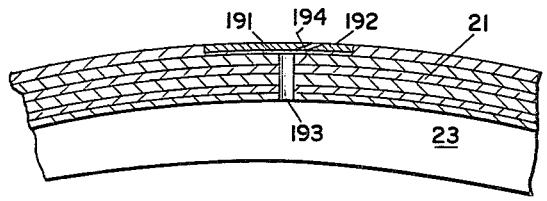
Figure 15:
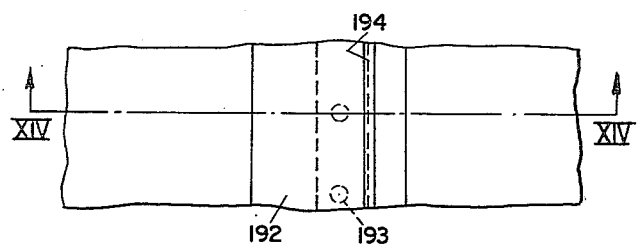

FIGURES 14 and 15 show a detail of a rotor blade.

Figure 1:
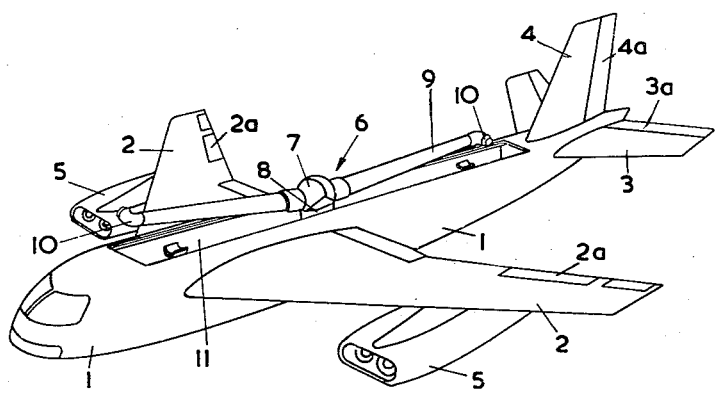
FIGURE 1 is a general view of one form of an aircraft according to the present invention.

The aircraft of FIGURE 1 comprises a fuselage 1, a pair of wings 2 having ailerons 2a, a tailplane 3 with elevators 3a and fin 4 and rudder 4a. The aircraft is powered by four gas turbine jet propulsion engines mounted in pairs in pods 5 under the wings. On top of the fuselage is mounted a two-bladed helicopter rotor generally indicated at 6 and comprising a rotor head 7 mounted on a pillar 8, a pair of rotor blades 9 attached to the head, and tip jet units 10 at the extremities of the blades. The rotor is retractable bodily into a bay 11 in the top of the fuselage (as will be explained more fully below) and the bay can be closed by doors or shutters (not shown).

Figure 2:
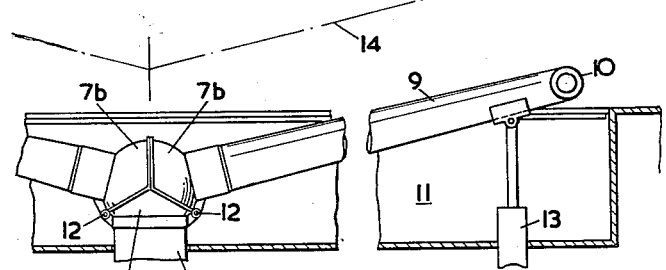
FIGURES 2 and 3 are views of the helicopter rotor of the aircraft of FIGURE 1, shown in two different positions.
Figure 3:
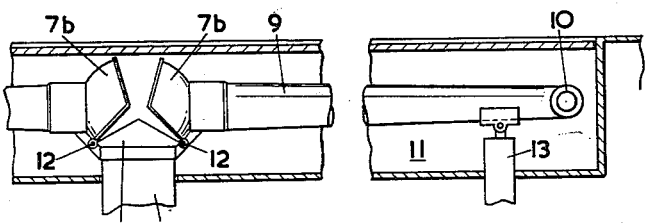

Reference is now made to FIGURES 2 and 3 which show the rotor head 7 as being made up of three parts, one part 7a being mounted on the top of the rotor pillar 8 and the other two parts 7b, to which are attached the rotor blades 9, being pivotally attached to part 7a at 12. The blades can be raised and lowered by jacks 13 within the bay 11. Thus in FIGURE 3 the rotor is shown as entirely retracted into the bay 11 with parts 7b separated and the rotor blades in a horizontal plane, substantially parallel to the aircraft longitudinal axis. By extending the jacks 13 the rotor blades are raised as shown in FIGURE 2 so that the parts 7b of the rotor hub can be locked together by locking means (not shown), for example, clamps fitting over the abutting flanges of the parts 7b. Finally the rotor is raised bodily out of the bay to a position such as that indicated by the chain dotted lines 14 in which it can rotate clear of the fuselage.

Figure 4:
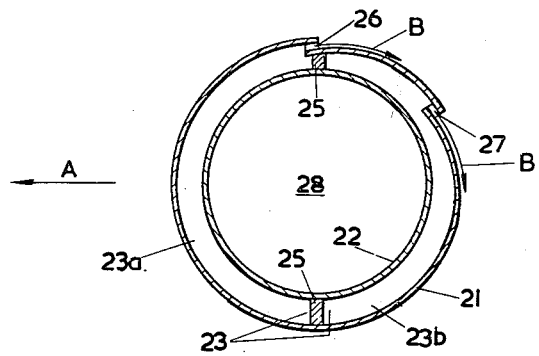
FIGURE 4 is a transverse section through a rotor blade.

Each of the rotor blades 9 is of circular section as shown in FIGURE 4 and comprises an outer shell 21 and an inner liner 22, the annular space 23 between them being divided into two semi-annular passages 23a, 23b by radial partitions 25. The shell is formed with two shallow discharge slots 26, 27 extending along the length of the blade. One slot 26 is in communication with duct 23a and is at the top of the blade and faces rearwardly with respect to the direction of rotation of the rotor (indicated by arrow A). The other slot 27 is in communication with duct 23b and faces rearwardly and downwardly, being spaced from slot 26 around the blade circumference by an angle of about 60°.

Lift on the rotor blades is induced by the boundary layer (or circulation) control effect of airstreams discharged downwardly from the slots 26, 27 over the rearward part of the blade surface as thin layers, indicated by the arrows B. In the drawing the slots 26, 27 are shown purely diagrammatically and their size has been greatly exaggerated for the sake of clarity. The air is supplied from the rotor head in a manner to be explained more fully below.

Figure 5:
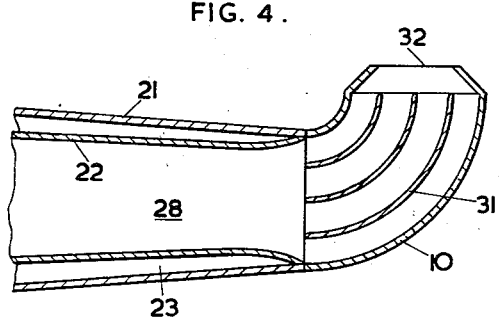
FIGURE 5 is a longitudinal section through the tip of a rotor blade.

A gas stream is also led to the tip jet unit 10 through the duct 28 defined by the liner 22. As shown in FIGURE 5 this unit consists of a right angle bend provided with corner vanes 31 and a jet nozzle 32 through which the stream is discharged to drive the rotor.

As shown in FIGURE 5, the rotor blades taper towards the tip. The annular space 23 and the discharge slots 26, 27 are dimensioned to give the optimum lift distribution along the blade.

Figure 6:
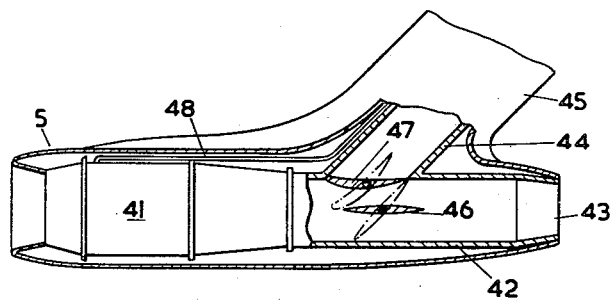
FIGURE 6 is part sectional view of one of the engines of the aircraft of FIGURE 1.

The air streams for the discharge apertures 26, 27 and the gas streams for the jet nozzles 32 are supplied by the jet engines. FIGURE 6 shows one such engine 41 mounted within the pod 5, the engine having a jet pipe 42 and jet nozzle 43 for the rearward discharge of a propulsive jet stream. The jet pipe has a branch pipe 44 leading through the pod-supporting strut 45 into the interior of the wing, and at the junction of the jet pipe and the branch pipe there is provided a jet deflector device consisting of two linked butterfly valves 46, 47. When the valves are in the position shown in full lines, the entry to the branch pipe is blocked and the engine exhaust stream is discharged through the jet pipe and nozzle in the usual way to produce forward thrust on the aircraft. When the valves are turned to the position indicated in broken lines, the jet pipe is closed and the exhaust stream diverted into the branch pipe. The diverted exhaust streams from the four engines are led to the rotor head and thence to the tip jet units to drive the rotor.

The jet engines 41 are preferably of the by-pass type so that their exhaust streams are at a relatively low temperature and ducting installation and insulation problems are simplified.

The air for discharge through the slots 26, 27 is bled from the by-pass compressors of the engines and led through pipes, such as 48 in FIGURE 6, through the strut 45 to a common manifold and thence to the rotor head.

The construction of the rotor hub and pillar and the way in which the driving gas stream and the air streams for boundary layer control are led to the rotor blades will now be explained in greater detail, reference being made to FIGURES 7a and 7b.

As shown in FIGURE 7a, the part 7a of the rotor head has a flange 7c which is bolted or otherwise secured to a corresponding flange 8a on the top of the rotor pillar 8. The parts 7b are formed with sockets into which fit the root ends of the outer shells 21 of the rotor blades 9, the blades being retained by interengaging buttress screw threads 51 and locking rings 52, and rotation of the blades and unscrewing of the threads being prevented by keys 52a. The parts 7a, 7b are further formed with interengaging lugs 7d, 7e respectively whereby they are pivotally jointed together at 12. The inner liners 22 are attached to the shells 21 at their root ends by annular brackets 53.

The rotor pillar 8 is supported in spaced bearings 54, 55 (FIGURES 7a and 7b) which are carried in rings 56, 57 rigidly connected by a number of guide bars 58. These bars are free to slide in a vertical direction in holes in spaced flanges 59a, 59b of a rotor support structure 59 which is rigidly attached to the aircraft structure. As indicated in FIGURE 7b, the upper flange 59a is level with the floor 60 of the bay 11. Jacks, for example, screw jacks such as 81, actuated by motor 82, and operating within the guide bars 58, are provided for raising and lowering the rotor pillar, and in this way the rotor may be extended from and retracted into the bay 11.

The rotor pillar 8 is provided with a liner member 61, the lower end of which is a sliding fit over a fixed inlet duct 62. This duct is connected at its lower end to a plenum chamber 63 which is fixed to the aircraft structure, and has inlets such as 64 connected to the branch pipes 44 of the engine jet pipes (see FIGURE 6). Thus the engine exhaust gases can be led into the interior of the rotor pillar, and thence to the interior of the rotor head and along the rotor blades to the tip jet units.

It will be appreciated that when the rotor is retracted, the liner 61 slides telescopically over the inlet duct 62. Seals (not shown) are provided to minimize leakage at the sliding joint.

The annular space 80 between the rotor pillar 8 and its liner 61 is closed at its lower end by a flange 61a on the liner and is divided circumferentially into four equal sectors, and these sectors constitute ducts for supplying air to the air discharge apertures 26, 27 in the rotor blades. The support structure 59 is formed with four annular galleries 65, 66, 67, 68 extending around the pillar 8 and these are supplied with air bled from the engines through individual pipes 69, 70, 71, 72 which are branched from the common manifold to which the pipes 48 are connected. The pillar is formed with four segmental apertures 73, 74, 75, 76 which are staggered with respect to another both circumferentially and vertically so that when the rotor head is in the extended position shown, each gallery is in communication with a separate one of the sector shaped ducts between the pillar and the liner. In this way, four separate streams may be led up the pillar to the rotor head.

At the upper end of the rotor pillar, the four sector-shaped ducts communicate with four corresponding sectors of an annular gallery 77 formed in the part 7a of the rotor head. Each sector of the gallery is formed with an outlet, such as 78 in FIGURE 7a, whereby it communicates with the interior of a horn-like duct 79. The other end of this duct carries a pad 79a formed with a face which bears against a corresponding face on the side of the rotor head part 7b, and is formed with an outlet opening 79b which registers with a corresponding inlet opening in the abutting face. There are four such horn-like ducts 79, one on each side of each rotor blade, and the inlet openings referred to are in communication one with each of the semi-annular passages 23a, 23b of the rotor blade (see FIGURE 4). It will be seen therefore that the discharge slots 26, 27 of the rotor blades are fed with separate streams of air which can be separately controlled by valves 83, 84, 86, 87 or the like in the four supply pipes 69, 70, 71, 72 as explained below.

The pads 79a have extensions to allow for the movement of the rotor blades when the latter are lowered to their fully retracted position as in FIGURE 3. Since there is relative movement between the blades and the pads only when the blades are being raised or lowered, it should be possible to ensure that the faces on the pads and the rotor hub parts 7a abut sufficiently closely to minimise leakage, contact being maintained by spring loaded seals.

The mode of operation of the aircraft will now be explained. For take-off, the doors or shutters of the bay 11 are first opened and the rotor blades 9 are raised by means of the jacks 13 so that the rotor head parts can be locked together. The rotor pillar 8 is then raised so that the rotor is extended from the bay. The jet deflector devices in the engine jet pipes are set to divert the exhaust streams into the branch pipes 44 and thence to the rotor and the tip jet units whereby the rotor is driven. Air from the engines is also supplied to the air discharge slots 26, 27 to induce lift on the rotor blades, and the aircraft is accordingly able to rise vertically. When sufficient height has been gained, the aircraft is tilted so as to give it some forward movement, while the jet deflector devices can be turned so that the engines give a certain amount of forward thrust and as forward speed is gained the rotor is relieved of the lift which is taken up by the wings. The jet deflector devices can then be turned to their normal position so that the drive to the rotor is discontinued, and the jet streams are discharged rearwardly to increase the aircraft forward speed. The air supply to the rotor blade boundary layer control slots is also discontinued. The rotor is allowed to run down and is finally brought to rest (by means of a brake applied to the rotor pillar if necessary) in a fore-and-aft position. The rotor is then retracted bodily into the bay while the jacks 13 are extended to receive the blades. The parts 7a, 7b of the rotor head are then unlocked and the blades lowered to a horizontal plane by retraction of the jacks 13. Finally the doors or shutters of the bay are closed.

For landing a reverse sequence of operations is followed. The various stages of operation for extending and retracting the rotor can be linked to take place in sequence automatically in response to movement of single initiating control.

The aircraft is controlled when in flight in the helicopter role by control of the air supply to the boundary layer control discharge slots. Thus the valves 83, 84 in the air supply lines 69, 70 to the slots 26, 27 of one rotor blade are operatively connected to a push rod 85 while the valves 86, 87 in the air supply lines 71, 82 to the slots of the other rotor blade are operatively connected to a second push rod 88. These push rods carry rollers 85a, 88a which engage with a rotatable swash plate 89. The opening of the valves is varied cyclically by the swash plate in an appropriate phased relationship to the rotation of the rotor, while pitching and rolling control can be achieved by a control operable to tilt the swash plate in a manner equivalent to the conventional cyclic pitch control of a helicopter. In addition the air supply to all the slots can be varied in unison to increase or decrease the lift by a control acting on the swash plate to raise and lower it bodily in a manner equivalent to the conventional collective pitch control. The former control is also connected to the elevators and ailerons for control of the aircraft in cruising flight. Directional control may be derived from differential control of the engine thrust.

Details of a swash plate mechanism as described and of the associated cyclic and collective pitch controls are disclosed in FIGURES 8 and 9 of United States Patent No. 2,756,007.

It will be noted that no flapping hinges are provided for the rotor blades which are set at a permanent cone angle when in operation. By appropriate design, it can be arranged that the centrifugal loads on the blades counteract the bending moment due to the lift forces so keeping the stress level low. This may require the provision of some additional mass at the rotor blade tips. Since lift variations are effected by control of the air supply to the slots, feathering hinges are not required, while the use of tip jet propulsion and the removal of the flapping hinges obviates the necessity for drag hinges. It would be possible to drive the rotor mechanically but this would involve the additional complication of drag hinges.

If necessary, additional boundary layer discharge slots can be provided in the blades. In such an arrangement the annular spaces between the rotor pillar and its liner and the rotor blade shells and their liners will be further subdivided, whilst the horn-like ducts 79 and their inlet and outlet apertures will also be divided to provide a separate air path to each discharge slot. Alternatively the discharge slots of each blade may be supplied in common as in the embodiment to be described below.

The rotor pillar 8 is preferably set with its axis at a small angle to the vertical so that the rotor disc when in operation is set at an angle to the wings and optimum performance conditions are obtained. It will be seen that one rotor blade will then have to be raised and lowered by jacks 13 to a greater extent than the other blade.

The aircraft shown in FIGURE 8 comprises a fuselage 1, a pair of wings 2, a tailplane 3 and a fin 4, and it is powered by four gas turbine jet propulsion engines of the by-pass type mounted in pairs in pods 5 under the wings. On top of the fuselage there is mounted a two-bladed helicopter rotor comprising a rotor head 7 enclosed by a dome 90, a pair of circular section rotor blades 9 and tip jet units 10 mounted at the extremities of blades.

As will be explained in more detail below, the rotor blades 9 are pivotally attached to the rotor head 7, and can be raised and lowered between a retracted or inoperative position (shown in full lines) in which they lie in a plane generally parallel to the longitudinal axis of the aircraft and an extended or operative position (shown in broken lines) by means of two pairs of jacks 91 and linkage 92. In the retracted position, the blades lie and are partly housed within longitudinal recesses 93 in the fuselage upper surface and are retained by means of locks 94. In the operative position the blades are raised clear of the fuselage and are locked at a pre-determined cone angle. It will be noted that the axis of the rotor is inclined to the vertical, so that the blades have to be raised through different angles. Part of the fuselage upper surface around the rotor head is formed by doors 95 or the like which can be retracted or folded back to allow sufficient clearance for the rotor to turn.

The rotor is driven by gas streams diverted from the engine jet-pipes, for example, in a manner described with reference to FIGURE 6. These gas streams are led through ducts 96 in the wings into the bottom of a vertical inlet duct 97 (see FIGURES 10 and 11) leading to the rotor head from which they pass along the rotor blades to be discharged from the tip jet units 10. Lift on the rotor blades is induced by the boundary layer control effect of airstreams discharged over the blade surface as thin layers, generally as described with reference to FIGURE 4. The air for these airstreams is bled from the bypass compressors of the engines and passes through pipes 98 to the rotor head from which it is led to the blades in a manner to be described below.

The construction of the rotor head and the way in which the driving gas streams and the air streams for boundary layer control are led to the rotor blades will now be described in greater detail with particular reference to FIGURES 11, 12 and 13.

As shown in FIGURE 11, the rotor head comprises a tubular member 121 having upper and lower flanges 121a, 121b. For the sake of simplicity this member is shown as being of unitary construction but in practice it would of course consist of a number of parts secured together. The member is rotatably supported by upper and lower bearing assemblies 122, 123 carried in a supporting structure 124 carried in the fixed structure of the fuselage. As shown, the lower bearing assembly 123 includes thrust bearings designed to take end loads in either direction.

Extending across the top of and secured to the tubular member 121, there is a diaphragm 125. A cover 126 is also secured to the top of the tubular member, the space between the cover and the diaphragm housing a gimbal ring mechanism to be described below. A liner 127 is carried within the tubular member 121 and defines therewith an annular space 128. The top of the vertical inlet duct 97 engages with an inner surface of the member 121, the latter being free to rotate with respect to this duct.

Reference is now made to FIGURES 12 and 13. Each of the rotor blades 9 has at its root end a pair of integral hollow bosses 131 rigidly secured to brackets 132 which are pivotally attached at 133 to lugs 134 formed on the upper flange 121a of the tubular member 121. Each blade can be turned about its pivots 133 by means of the jacks 91 and linkage 92, and when in the raised or operative position as shown in FIGURES 12 and 13, its root end abuts with a flange 135a on the end of a hollow branch duct 135 from the tubular member 121. The blades are retained in the operative position by catches 136 which engage with lugs 132a on the brackets 132, each catch being mounted on a pair of rods 137 whereby they can be moved into and out of engagement with the lugs by means of a hydraulic jack 138 mounted on the diaphragm 125 (see FIGURE 11).

As in the previously described embodiment, each motor blade 9 is made up of an outer shell 21 and an inner liner 22 defining between them an annular space 23. When the blade is in the raised or operative position, the duct 28 defined by the liner 22 is in communication through the interior of branch duct 135 with the interior of tubular member 121. Thus the gas streams diverted from the engines and supplied to vertical inlet duct 97 can be led along the rotor blades to the tip jet units 10 to drive the motor.

The ducts 98 for the boundary layer control air are connected to elongated inlet apertures 151, one on each side of the supporting structure 124. These apertures open into an annular gallery 152 surrounding the tubular member 121, and this gallery in turn is in communication with the annular space 128 between the tubular member 121 and its liner 127 by means of a ring of holes 153 in the tubular member. The space 128 has a pair of opposite elongated outlet apertures 154 to each of which is connected a horn-like duct 155 (not shown in FIGURE 12 and shown as broken away in FIGURE 11). These ducts extend in opposite senses and carry at their ends slipper pads 155a which bear against corresponding surfaces on the brackets 132 and are formed with outlet orifices which, when the blades are in their raised or operative positions, register with corresponding inlet openings 156 in the abutting surface. The horn-like ducts thus serve to conduct boundary layer control air from the space 128 into the hollow bosses 131 and thence into the space 23 between the shell and liner of the blade, one duct supplying each blade. From the space 23 the air is discharged through narrow slots extending along the length of the blade, one slot being located at the top of the blade and facing rearwardly and the other being spaced by an angle of about 60° from the other and facing rearwardly and downwardly, as shown in FIGURE 4. It is to be noted however that in this embodiment the space 23 is not divided longitudinally, the supply to the two slots being common. The slots are dimensioned to effect the required division of the air supply between them.

It is necessary to vary the supply of boundary layer control air to the blades cyclically in accordance with the rotation of the rotor and also in dependence on the pilot's controls. Each outlet aperture 154 is accordingly provided with a gate valve 161 carried on the end of a push rod 162 and the setting of these valves is controlled by a gimbal ring mechanism in the top of the rotor head.

This mechanism includes a sleeve member 171 which is slidably mounted on a stationary pillar 172 extending from the lower end of vertical inlet duct 97 and located relative to diaphragm 125 and cover 126 by bearings 173 and 174. A cover 175 is secured to the top of the pillar, and to this cover is pivotally attached a hydraulic jack 176. The operating rod 176a of this jack carries a cross rod 177 extending through longitudinal slots 178 in the pillar and connected to the sleeve member 171. Thus the jack is effective to move the sleeve member upwardly and downwardly on the pillar.

The sleeve member 171 is provided at diametrically opposite positions with brackets 171a which carry on pivots 179 the support members 180 for an inner gimbal ring 181. Each support member comprises a pair of side plates 180a, to which the gimbal ring is secured, connected by cross piece 180b pivotally secured to the bracket 171a. At right angles to brackets 171a the sleeve is provided with two diametrically opposite pairs of arms 171b, each pair carrying between them on pivots 182 a hydraulic jack 183. The operating rod 183a of each jack 183 is connected through links 184 to the gimbal ring 181, and it will be seen that by means of these jacks the gimbal ring 181 can be tilted about the pivots 179.

An outer gimbal ring 185 surrounds the inner gimbal ring 181 and is carried thereby on pivots 186 at right angles to the pivots 179. Hydraulic jacks 187 are carried on pivots 188 between the side plates 180a of support members 180, and the operating rods 187a of these jacks are connected through links 189 to the outer gimbal ring 185. Thus by means of the jacks 187, the outer gimbal ring 185 can be tilted about the pivots 186. This gimbal ring is formed with a track 185a on which run rollers 163 carried on the upper ends of push rods 162.

The various hydraulic jacks 176, 183, 187 are supplied with hydraulic fluid by means of conduits (not shown) extending through the pillar 172. The supply to jack 176 is adjustable by a control equivalent to the conventional collective pitch control of a helicopter, the jack being effective to raise and lower the sleeve 171 and gimbal rings 181, 185 bodily so that the valves 161 are opened or closed together and the air supply to the discharge slots in opposite blades varied in unison. The supply to jacks 183, 187 is adjustable by a control equivalent to the conventional cyclic pitch control of a helicopter, the gimbal rings being tilted about axes at right angles to one another so as to vary the supply to opposite rotor blades in an appropriate phased relationship to the rotation of the rotor, depending on the setting of the control.

Operation of the aircraft is generally the same as in the case of the previously described embodiment. It will be noted that when the aircraft is in forward flight the blades are only partly housed in the recesses 93, and as the rotor is not retractable bodily into the fuselage the dome 90 enclosing the rotor head necessarily protrudes from the surface of the fuselage. The consequent aerodynamic losses are however offset, at least to some extent, by the saving in weight and space effected by dispensing with the retraction mechanism of FIGURES 7a and 7b.

The lower flange 121b of the tubular member 121 is formed with gear teeth 121c. Provision may be made for taking drives from this gear for lubrication pumps and for measurement of rotational speed. It can also provide the drive to establish a datum for the required relationship between rotor position and the aircraft essential for correct stowage of the rotor blades. A drive may also be applied to the gear to turn the rotor to the fore-and-aft position before lowering the blades to their inoperative position. A gear may be provided on the lower end of the rotor pillar 8 of FIGURES 7a and 7b for the same purposes.

FIGURES 14 and 15 show the details of one possible construction of the air discharge slots in the rotor blades, the arrangement being applicable to both of the embodiments described. The outer shell 21 of the blade is made up of a number of laminations, the outermost of which is cut away to form a longitudinal channel 191 covered by a cover plate 192. The remainder of the laminations are formed with a row of holes 193 extending along the blade span for leading air from the space 23 between the shell and liner into the channel 191. The cover plate 192 is formed with an inclined slot 194 through which the air is discharged over the blade surface. The size of the holes 193 varies along the length of the blade to effect the required spanwise distribution of the air supply along the blade length, and hence the required lift distribution. Also in the case of the embodiment of FIGURES 8 to 13, the size of the holes 193 will be different for the two discharge slots whereby the required distribution of the air supply between them is achieved.

Numerous variants of embodiments described above are envisaged. Thus the arrangement of FIGURES 1 to 7 may be modified by dispensing with provision for raising and lowering the rotor bodily, the blades being lowered into recesses in the fuselage upper surface and the rotor head being allowed to protrude from the fuselage as in the embodiment of FIGURES 8 to 13. The boundary layer control air supply inlets are, in this modification, spaced circumferentially around the axis of the rotor head and controlled by gate valves operated by a gimbal ring mechanism below the rotor head and coaxially surrounding the inlet duct 62. Such an arrangement may be heavier than that of FIGURES 8 to 13, but the rotor head will be smaller and the consequent aerodynamic losses less.

In a variant of the embodiment of FIGURE 8–13, the gas streams from the engines in each wing are led separately into the rotor head from each side thereof, so that the obstruction caused by the vertical inlet duct 97 is avoided.

The engines could be mounted at the aircraft tail rather than on the wings as described, in which case three engines could be used.

The device for diverting the engine jet streams shown in FIGURE 6 may be modified on the lines of the devices now coming into use as thrust reversers for jet aircraft. In any case it is considered desirable to provide a non-return valve in the branch conduit from each engine to counteract reverse flow in the event of engine failure.

Some departure from a strictly circular cross-section for the rotor blades is permissible, i.e. the blades can be somewhat elliptical, while retaining the advantages of the invention.

We claim:

1. An aircraft comprising a fuselage; a two-bladed helicopter rotor comprising a rotor head rotatably mounted on top of the fuselage, two opposite rotor blades of substantially circular cross-section, means locking the blades to the rotor head in an operative position at a pre-determined cone angle in which the rotor can rotate with the blades clear of the fuselage, each blade comprising an outer shell and an inner liner coaxial therewith, the liner defining a substantially circular section passage and the shell and liner defining between them an annular passage, both passages extending longitudinally of the blade, and the outer shell of each blade being formed with at least one long shallow aperture opening from the annular passage and extending along the blade; tip jet units mounted on the extremities of the blades and connected to be supplied from said circular section passage; means for moving the rotor blades between said operative position and a position in which they are at least partly retracted into the fuselage; at least one gas turbine jet propulsion engine comprising a compressor and having a jet nozzle arranged to discharge a jet stream rearwardly so as to produce forward thrust on the aircraft; duct means extending from said engine to said circular section passage of each blade; jet deflector means operable to divert the jet stream from said nozzle into said duct means; and duct means connecting said compressor to supply compressed air to said annular passage of each blade, each said aperture being arranged to discharge the air as a thin layer downwardly over the rearward part of the outer surface of the blade.

2. An aircraft comprising a fuselage; wings capable of supporting the aircraft by aerodynamic lift thereon in forward flight; a helicopter rotor rotatably mounted on top of the fuselage and having rotor blades of substantially circular cross-section, said blades being formed with long shallow apertures extending along the blade span; means mounting said rotor blades for movement between a position such that the rotor can rotate with the blades clear of the fuselage and a position in which the blades are at least partly retracted into the fuselage; tip jet units mounted on the rotor blade extremities; at least one gas turbine jet propulsion engine of the by-pass type having a jet nozzle arranged to discharge a jet stream rearwardly so as to produce forward thrust on the aircraft; duct means extending from said engine to said tip jet units and including ducts of substantially circular cross-section extending through said rotor blades; jet deflector means operable to divert said jet stream from said nozzle into said duct means; and further duct means connecting the by-pass compressor of said engine to supply compressed air to said apertures in the rotor blades, said apertures being arranged to discharge the air as thin layers over the blade surfaces.

3. An aircraft comprising stationary structure including a fuselage and wings capable of supporting the aircraft by aerodynamic lift thereon in forward flight; a helicopter rotor including a rotor head rotatably mounted on top of said structure, rotor blades of substantially circular cross-section, each blade being formed with at least one aperture extending along its length, and means for rigidly locking the blades to the rotor head in an operative position in which they are set as a pre-determined fixed cone angle; means for moving the rotor blades between said operative position and an inoperative position in which they are at least partly retracted into said structure; a source of supply of fluid; and duct means connecting said source to said apertures in the rotor blades, said apertures being shaped and arranged to discharge streams of the fluid as thin layers over the blade outer surfaces in such a direction as to induce lift on the blades when the rotor is rotating.

4. An aircraft comprising stationary structure including a fuselage and wings capable of supporting the aircraft by aerodynamic lift thereon in forward flight; a helicopter rotor including a rotor head rotatably mounted on top of said structure, rotor blades of substantially circular cross-section, each blade being formed with at least one aperture extending along its length, and means for rigidly locking the blades to the rotor head in an operative position in which they are set at a predetermined fixed cone angle; means for moving the rotor blades between said operative position and an inoperative position in which they are at least partly retracted into said structure; a source of supply of fluid; and duct means connecting said source to said apertures in the rotor blades, said apertures being shaped and arranged to discharge streams of the fluid as thin layers downwardly over the rearward parts of the blade outer surfaces.

5. An aircraft comprising stationary structure including a fuselage and wings capable of supporting the aircraft by aerodynamic lift thereon in forward flight; a helicopter rotor including a rotor head rotatably mounted on top of said structure, rotor blades of substantially circular cross-section, each blade being formed with at least one aperture extending along its length, and means for rigidly locking the blades to the rotor head in an operative position in which they are set at a pre-determined fixed cone angle; means for moving the rotor blades between said operative position and an inoperative position in which they are at least partly retracted into said structure; a source of supply of fluid; duct means connecting said source to said apertures in the rotor blades, said apertures being shaped and arranged to discharge streams of the fluid as thin layers over the blade outer surfaces in such a direction as to induce lift on the blades when the rotor is turning; and means operable to vary the discharge of fluid through said apertures in the blades cyclically in dependence upon rotation of the rotor.

6. An aircraft comprising stationary structure including a fuselage and wings capable of supporting the aircraft by aerodynamic lift thereon in forward flight; a helicopter rotor including a rotor head rotatably mounted on top of said structure, rotor blades of substantially circular cross-section, each blade being formed with at least one aperture extending along its length, and means for rigidly locking the blades to the rotor head in an operative position in which they are set at a pre-determined fixed cone angle; means for moving the rotor bodily along its rotational axis to retract the rotor blades into said structure; a source of supply of fluid; and duct means connecting said source to said apertures in the rotor blades, said apertures being shaped and arranged to discharge streams of the fluid as thin layers over the blade outer surfaces in such a direction as to induce lift on the blades when the rotor is rotating.

7. An aircraft according to claim 6 wherein the rotor blades are pivotally attached to the rotor head, and further comprising means for moving the blades about their pivots between said operative position and a lowered inoperative position in which they lie in a plane generally parallel to the longitudinal axis of the fuselage.

8. An air craft comprising stationary structure including a fuselage and wings capable of sustaining the aircraft by aerodynamic lift thereon in forward flight; a helicopter rotor comprising a rotor head rotatably mounted on top of said structure, rotor blades of substantially circular cross-section pivotally attached to the rotor head, each blade being formed with at least one aperture extending along its length, and means for rigidly locking the blades to the rotor head in an operative position in which they are set at a pre-determined fixed cone angle; said structure being formed in its upper surface with blade-receiving recesses; means for moving the rotor-blades about their pivots between said operative position and an inoperative position in which they lie in said recesses; a source of supply of fluid; and duct means connecting said source to said apertures in the rotor blades, said apertures being shaped and arranged to discharge streams of the fluid as thin layers over the blade outer surfaces in such a direction as to induce lift on the blades when the rotor is rotating.

9. An aircraft comprising a fuselage; wings capable of supporting the aircraft by aerodynamic lift thereon in forward flight; a helicopter rotor including a rotor head rotatably mounted on top of the fuselage, a pair of opposite rotor blades of substantially circular cross-section each blade being formed with at least one aperture extending along its length, and means for rigidly locking the blades to the rotor head in an operative position in which they are set at a pre-determined fixed cone angle; tip jet units mounted on the rotor blades extremities; means for moving the rotor blades between said operative position and an inoperative position in which they are at least partly retracted into the fuselage; a source of supply of fluid; duct means connecting said source to said apertures in the rotor blades, said apertures being shaped and arranged to discharge streams of the fluid downwardly over the rearward parts of the blade outer surfaces; and means operable to vary the discharge of fluid through the apertures in opposite blades cyclically in dependence upon rotation of the rotor and in antiphase relationship with one another.

References Cited in the file of this patent

UNITED STATES PATENTS

| | | |
|---|---|---|
| 2,344,515 | Massey | Mar. 21, 1944 |
| 2,608,257 | Godfrey | Aug. 26, 1952 |
| 2,653,778 | Bennett et al. | Sept. 29, 1953 |
| 2,738,146 | Medvedeff | Mar. 13, 1956 |
| 2,749,059 | Meyers et al. | June 5, 1956 |
| 2,756,007 | Laskowitz | July 24, 1956 |
| 2,925,129 | Yuan et al. | Feb. 16, 1960 |

FOREIGN PATENTS

| | | |
|---|---|---|
| 1,107,179 | France | Aug. 3, 1955 |